J. B. GURY.
LIFTER FOR CLOTH CUTTING MACHINES.
APPLICATION FILED NOV. 29, 1916.
1,259,618.
Patented Mar. 19, 1918.
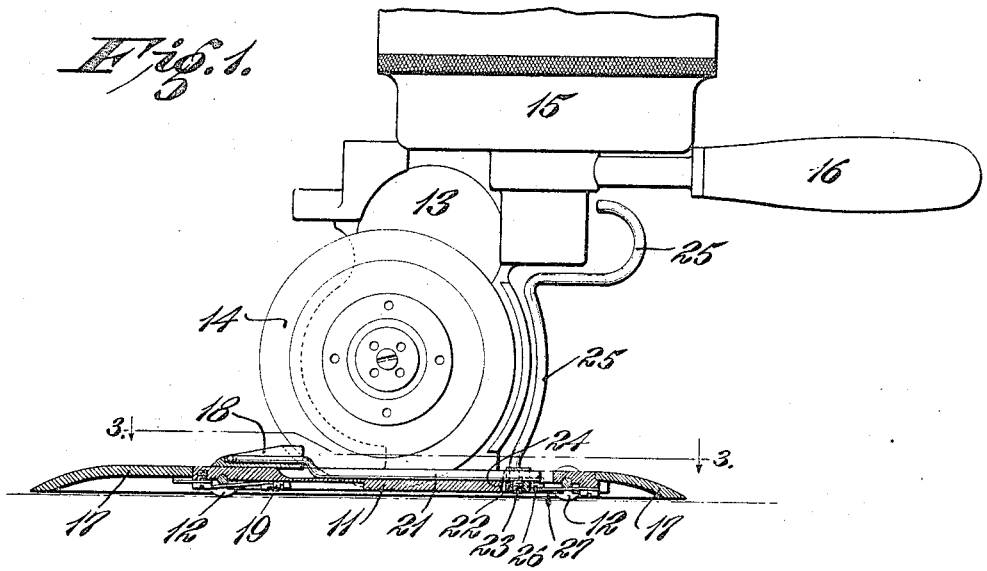
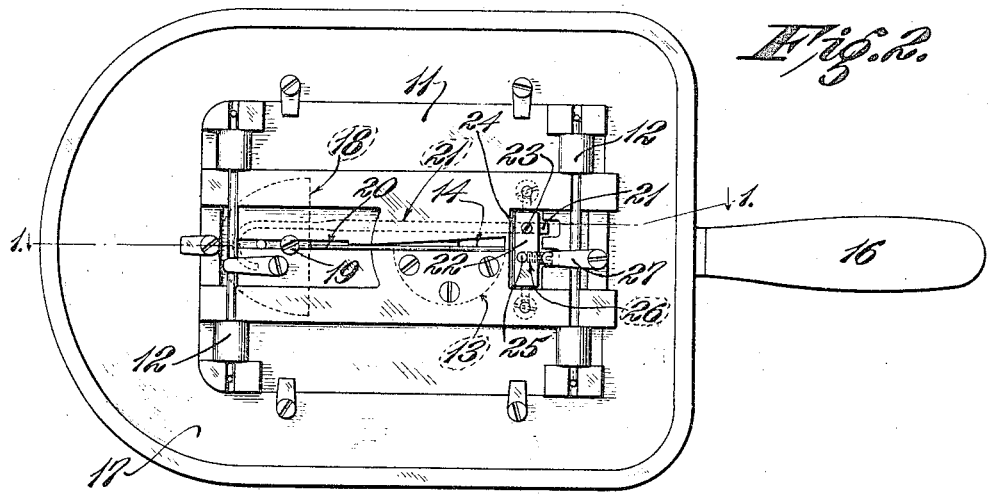
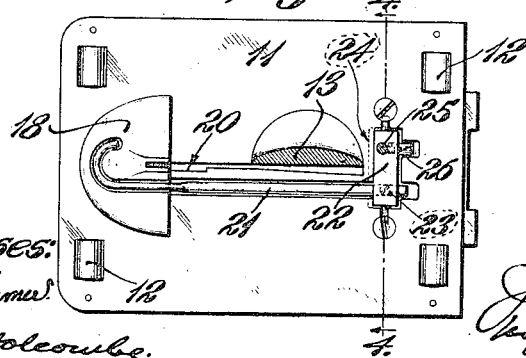
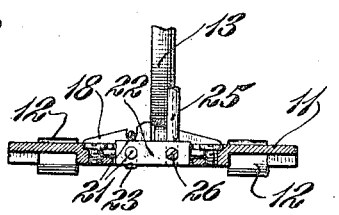

UNITED STATES PATENT OFFICE.

JOHN B. GURY, OF ST. LOUIS, MISSOURI.

LIFTER FOR CLOTH-CUTTING MACHINES.

1,259,618.

Specification of Letters Patent.

Patented Mar. 19, 1918.

Application filed November 29, 1916. Serial No. 134,074.

*To all whom it may concern:*

Be it known that I, JOHN B. GURY, a citizen of the United States, and a resident of the city of St. Louis and State of Missouri, have invented a new and useful Improvement in Lifters for Cloth-Cutting Machines, of which the following is a specification.

This invention relates particularly to cloth cutting machines of the type shown in my Patents No. 665,167 and No. 1,150,265, but it is applicable to any cloth cutting machine having a rotary cutter.

Cloth cutting machines are adapted for cutting many thicknesses of cloth at once, the "lay" or pile of cloth to be cut frequently being from one to two inches in thickness. With thick lays, a rotary cutter does not cut the bottom thicknesses of cloth as far along the line of cut as the top thicknesses, and in order to cut up to a corner it has been necessary heretofore for the operator to stop the forward movement of the machine, and lift up the bottom layers to bring them up to the same point on the cutter as the top layers so as to cut all layers alike. This is dangerous, as it requires the operator to bring his fingers into close proximity to the cutter.

An object of this invention is to enable the operator of the machine to lift the cloth at will without removing his hand from the handle of the machine. A further object is to enable a high speed of cutting to be maintained by eliminating delay from lifting the cloth by hand at the corners. Further objects appear below in the description of the invention.

The invention consists in an adjustable arm or lifter which is pivoted to the base of the machine with its free extremity beneath the front edge of the cutter, and a finger bar projecting up from the rear end of the lifter in position to be readily grasped by the finger of the operator to throw the lifter arm and cloth up against the cutting blade. What the invention consists in is further stated in the claims.

The invention is illustrated in the accompanying drawings as applied to a cloth cutting machine having an electrically driven rotary cutter. In the drawings, wherein the same reference characters designate the same parts in the several views, Figure 1 is a side elevation of the machine, the base portion being in section on the line 1—1 in Fig. 2;

Fig. 2 is a bottom plan view;

Fig. 3 is a top plan view of the central portion of the base containing the lifter, the frame being shown in cross-section on the line 3—3 in Fig. 1, and the upper portion removed; and Fig. 4 is a transverse cross-section of the base of the machine, on the line 4—4 in Fig. 3.

The cloth cutting machine shown in the drawings comprises a thin base 11 mounted on small rollers 12 which are concealed beneath it. The base supports a standard 13 upon which the motor and gearing for driving the cutter 14 are mounted. The motor and gearing are inclosed in a casing 15, from the rear side of which the handle 16 projects. The base is inclosed by a foot plate 17 which is adapted to be shoved under a pile of cloth or "lay", to bring the cutter against the thicknesses of cloth. The standard 13 is narrow enough to follow the cutter through the cloth between the severed portions of the lay. The lay of cloth is supported against the front edge of the cutter 14 by means of an adjustable rest 18 which is slidably mounted upon the base 11 below and in front of the cutter 14. The rest 18 may be adjusted horizontally toward or from the cutter 14 by loosening the screw 19 which secures it to the base. This screw 19 goes through a suitable slot 20 in the base to permit sufficient movement of the rest 18 to adjust it to the change in diameter of the cutter due to grinding it.

The lay is lifted against the cutter by means of a horizontal lifting rod or arm 21 which projects in front of the cutter and normally lies in a recess in the top of the rest 18. The front end of the arm curves around in front of the cutter, and the rear end is slidably arranged in a pivot block 22 which is mounted in a slot extending crosswise of the base 11 behind the standard 13. The pivot block is arranged to strike against the front wall 24 of the slot when the end of the lifter arm tilts up as high as the center of the cutter. The length of the lifter arm can be adjusted by sliding it through the block 22. The lifting arm is held in adjusted position in the block 22 by a set screw 23.

Extending up from the pivot block is a lever or bar 25 having a finger hold at its end positioned just under the handle 16 of the machine, in which position it is possible for the operator to engage and manipulate it with the index finger of his hand without releasing the grip of said hand on the handle. This finger bar is held in a hole in the pivot block 22 by means of a set screw 26. A flat spring 27, which is secured beneath the base 11 to the rear of the pivot block, presses up on the end of the set screw 26 and normally holds the lifting arm in horizontal position with its curved front end in the groove in the rest 18. The bar 20 normally is out of the way beneath the cloth, but by pulling back the finger bar 25, the curved front end of the bar 20 is raised, thereby lifting the lay against the knife. Both lifter bar and rest may be adjusted toward or from the cutter.

The invention is not restricted to the details of construction shown and described.

What I claim as my invention is as follows:

1. An attachment for a cloth cutting machine having a rotary cutter and a handle, said attachment comprising an arm attached to the base of the machine and arranged beneath and in front of said cutter, said arm having a portion adapted to encircle the cutting edge of said cutter and being adjustable in length, and an operating lever for raising said arm, said operating lever being positioned adjacent to said handle, whereby the arm may be adapted to varying sizes of cutters so that the cloth may be raised in front of the middle of the cutter.

2. A cloth cutting machine having a cloth lifter pivotally mounted thereon for pressing cloth against the cutter, said lifter comprising a pivot member, a hook shaped rod mounted horizontally in said pivot member and longitudinally adjustable therein and a vertically arranged arm, means for limiting the tilting movement of said lifter, and means for normally holding said first-mentioned arm horizontal.

3. A cloth cutting machine having a cloth lifter pivotally mounted thereon for pressing cloth against the cutter, said lifter comprising a horizontally arranged arm and a vertically arranged arm, said horizontally arranged arm being supported at its front end in a rest, said rest and arm being adjustable to suit the size of the cutter, and means for normally holding said arm horizontal.

Signed at St. Louis, Missouri, this 25th day of November, 1916.

JOHN B. GURY.

Copies of this patent may be obtained for five cents each, by addressing the "Commissioner of Patents, Washington, D. C."